United States Patent [19]

Gregory et al.

[11] 4,039,760

[45] Aug. 2, 1977

[54] CORDLESS TELEPHONE SYSTEM

[75] Inventors: L. Duane Gregory, Colton; Douglas G. Talley, Los Angeles, both of Calif.

[73] Assignee: Teletronics United Inc., Riverside, Calif.

[21] Appl. No.: 450,061

[22] Filed: Mar. 11, 1974

[51] Int. Cl.² .............................................. H04Q 7/04
[52] U.S. Cl. .................................... 179/41 A; 325/55
[58] Field of Search ......................... 179/41 A, 100 R; 325/16, 55, 64; 343/176, 177, 228

[56] References Cited

U.S. PATENT DOCUMENTS

| | | | |
|---|---|---|---|
| 2,884,518 | 4/1959 | O'Neill | 343/228 |
| 2,912,574 | 11/1959 | Gensel | 343/228 |
| 2,972,021 | 2/1961 | Bryant et al. | 179/84 T |
| 3,286,184 | 11/1966 | Blitchington, Jr. | 179/41 A |
| 3,366,880 | 1/1968 | Driver | 179/41 A |
| 3,384,718 | 5/1968 | Wilder | 179/100 D |
| 3,443,035 | 5/1969 | McCay | 179/41 A |
| 3,476,882 | 11/1969 | Vogelman et al. | 179/41 A |
| 3,489,860 | 1/1970 | Greenman et al. | 179/100 R |
| 3,551,815 | 12/1970 | Berman | 179/41 A |
| 3,590,166 | 6/1971 | Anschutz et al. | 179/41 A |
| 3,594,515 | 7/1971 | Brown | 179/84 T |
| 3,644,681 | 2/1972 | Rice | 179/41 A |
| 3,840,811 | 10/1974 | Blouch | 179/41 A |

Primary Examiner—William C. Cooper
Assistant Examiner—Gerald L. Brigance
Attorney, Agent, or Firm—Richard J. Rengel

[57] ABSTRACT

A duplex voice communication link including controls therefor as provided between a Base Station connected directly to a telephone line of a telephone exchange and a Mobile Unit consisting of a small, compact cordless telephone instrument containing transmitter, receiver and control circuits powered by a rechargeable battery pack. A single logic tone is transmitted and detected for all logical control for ring signals, on-hook and off-hook signals and dial pulses.

4 Claims, 12 Drawing Figures

FIGURE 1
BASE STATION

FIGURE 2
MOBILE UNIT

FIGURE 3
TIMING DIAGRAM

FIGURE 4
RECEIVER FRONT END

FIGURE 4A

FIGURE 5
TONE DECODER

CORDLESS TELEPHONE SYSTEM

BACKGROUND OF THE INVENTION

In a duplex communication link such as provided in the present invention for a cordless telephone system, one of the main difficulties is in providing for two-way transmission with sufficient selectivity in the receivers to reject transmission from adjacent, co-located transmitters. In one of the prior art duplex communication systems the receiver in the duplex link includes four stages of ordinary IF filtering. The difficulty in this system is that the carrier frequencies must be separated a sufficient amount so that transmitted and received carrier frequencies avoid interference capable of disabling the receivers. Under these constraints of widely separated transmit and receive frequencies, it is difficult to conform to Federal regulations without operating in a licensed frequency band for transmission. Accordingly, in the prior art system, the citizens band is used for one transmission frequency of the duplex link and a lower high frequency (HF) band, separated by several MHz, is used for the other. Due to the radiation restrictions in the lower HF frequency band, the range of the system is unduly limited.

Another difficulty found in the prior art is that maintenance of the connection to the telephone line is dependent upon a continuous tone transmitted from the Mobile Unit which is detected and used to close the telephone line relay when the tone is present. This has been found unsatisfactory because of momentary radio interference or fading of the signal transmission causes an interruption of the telephone connection.

SUMMARY OF THE INVENTION

In order to overcome the difficulties of the prior art telephone duplex communication systems, the present invention provides narrow bandpass filtering to enable closely adjacent, co-located transmitters and receivers to operate within a narrow frequency band, and preferably all transmission of the duplex link is totally within the citizens band. This filtering also provides for eliminating interference and enables the utilization of power levels which substantially increase the range over prior systems. Another advantage of the present invention is the system arrangement which provides a single logic tone to convey all control information. The preferred arrangement includes tone decoders having a frequency stabilized voltage control oscillator operating in a phase lock loop. The tone decoders supply a logic tone and also provide for decoding a received logic tone to produce binary logic level outputs at both the Base Station and Mobile Unit. The advantage of using a single tone with pulse width modulation of the present invention is that it provides for significant reduction in circuitry over other prior art systems using a multitone control signaling arrangement and further, the single tone provides positive control that overcomes difficulties of interference encountered by prior systems.

One of the more important features of the present invention is the elimination of interference between adjacent transmitter and receiver located in both the Base Station and in the Mobile Unit of a cordless duplex telephone system. As noted earlier, the prior art overcame interference by a large separation in the transmitted and received frequencies, e.g., as far apart as possible. This presented difficulties because of Federal regulations concerning unlicensed two-way communications. Separation was provided by transmission in the lower end of the HF spectrum and transmission in the citizens band, i.e., higher end of the HF spectrum. Due to the restrictions on the power of transmission in the lower end of the HF spectrum, the range of the system is severely limited. However, in the present invention the duplex transmission frequencies are both located in the citizens band where sufficient power is permitted by Federal regulations to achieve the desired range for the duplex link while avoiding the problem of interference. Interference is eliminated in the duplex link by monolithic crystal filters located in the front end of the receivers to reject transmission by the adjacently located transmitters.

Other features of the invention include antenna, transmitter/receiver and logical circuitry disposed in a minimum area provided by more recent small telephone handsets. This structural arrangement has been provided by development of a miniature receiver antenna for the citizens band which can be located in the handset and in the cradle of small telephone instruments. Another feature is to provide a tone which is reproduced by the speaker in the handset and normally used for telephone conversation. This structural arrangement replaces the conventional bell ringer to provide space for transmitter, receiver and control circuitry.

Another feature of the present invention is to provide a cradle base for supporting and enclosing receiver and control circuits. In the handset, the transmitter circuit is located on a printed circuit board which is secured in the earpiece which also provides support for the earpiece speaker.

An important feature of the invention was to avoid power consumption in the Mobile Unit which is powered by a battery pack by turning the transmitter off when the telephone is not in use and the handset is on-hook. Also, power is conserved by circuitry using complementary field effect transistor logic and reducing the on-time of the receiver and control circuitry 90% while monitoring for a telephone ring signal.

BRIEF DESCRIPTION OF THE DRAWINGS

FIGS. 7 and 7A are pictorial views of the handset of the telephone Mobile Unit, and FIG. 7 shows the microphone and speaker assemblies exploded, and FIG. 7A shows the speaker and transmitter assembly partly broken away and in section to show details of construction of the invention.

DESCRIPTION OF THE PREFERRED EMBODIMENTS

Figure 1:
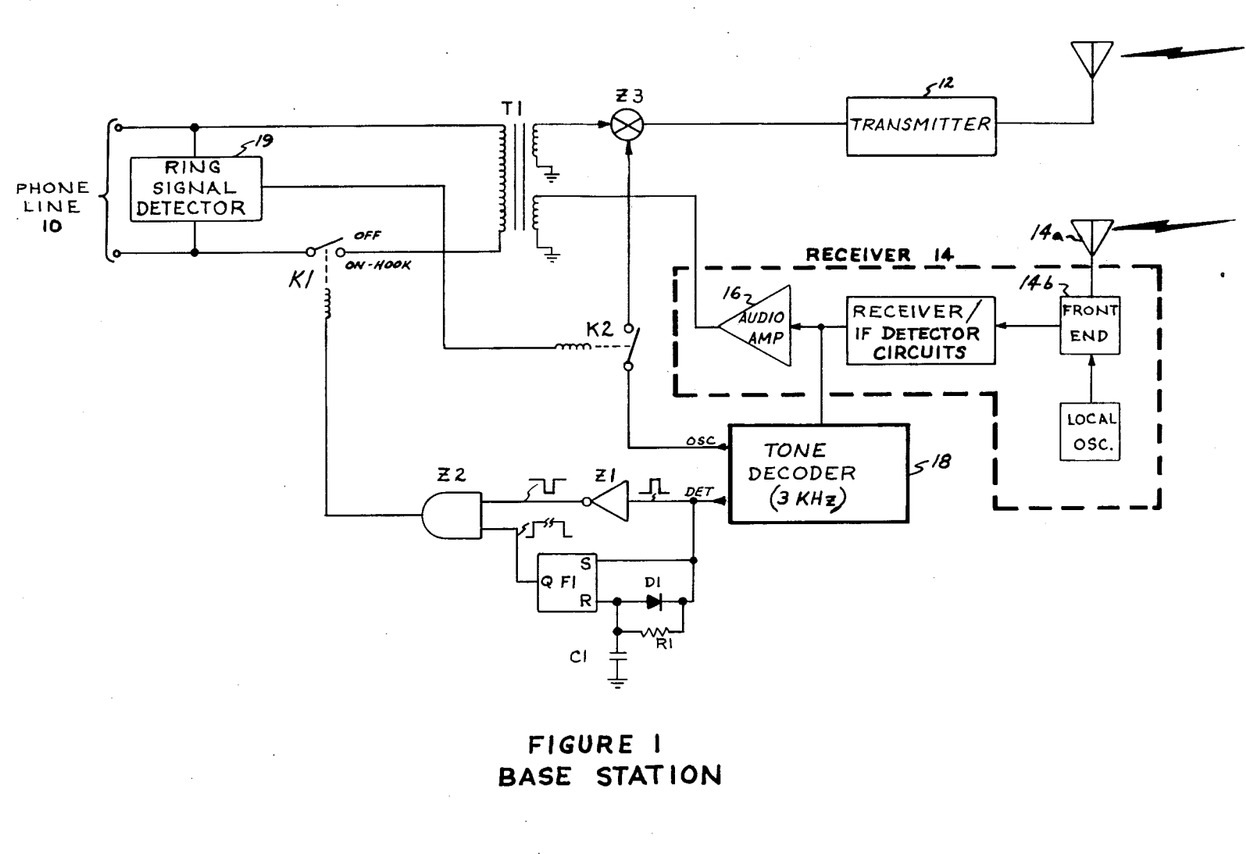
FIG. 1 is a schematic block diagram of the preferred cordless telephone system Base Station including transmitter, receiver and control circuitry which connect the duplex, high-frequency line (HF) directly to the telephone line.
Figure 2:
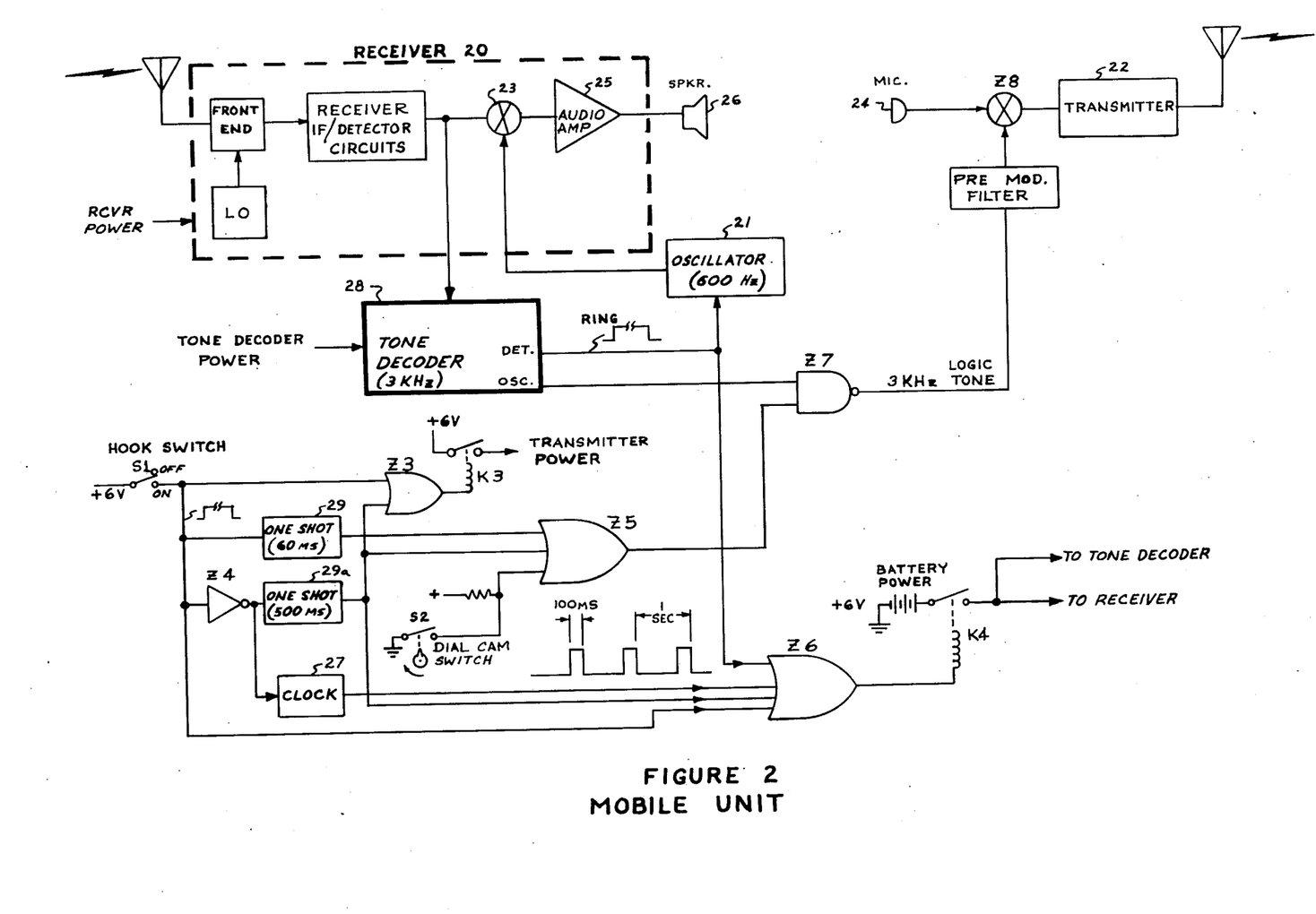
FIG. 2 is a schematic block diagram of the preferred cordless telephone system Mobile Unit including a cordless telephone instrument having a transmitter, receiver and control circuitry for completing the duplex line to the Base Station of FIG. 1.

Referring now to FIGS. 1 and 2 for a more detailed description of the preferred cordless telephone system of the present invention, the system provides a two-way or duplex voice communication link from a Mobile Telephone Unit of FIG. 2 which receives incoming calls as well as outgoing calls by radiant energy transmission between the Mobile Unit of FIG. 2, and the terminal Base Station of FIG. 1. The Base Station is connected directly to the subscribers telephone line 10 from a telephone exchange when the circuit through Switch K1 is completed.

DUPLEX VOICE TRANSMISSION

In FIG. 1, duplex voice transmission in the system of the invention is provided through the Base Station and line 10, and thereby to and from the telephone exchange and network, by Audio Transformer T1 having a primary winding connected across line 10; and dual secondary windings coupled to an AM Transmitter 12 via summing, operational Amplifier Z3, and Receiver 14 via Audio Amplifier 16.

Figure 6:
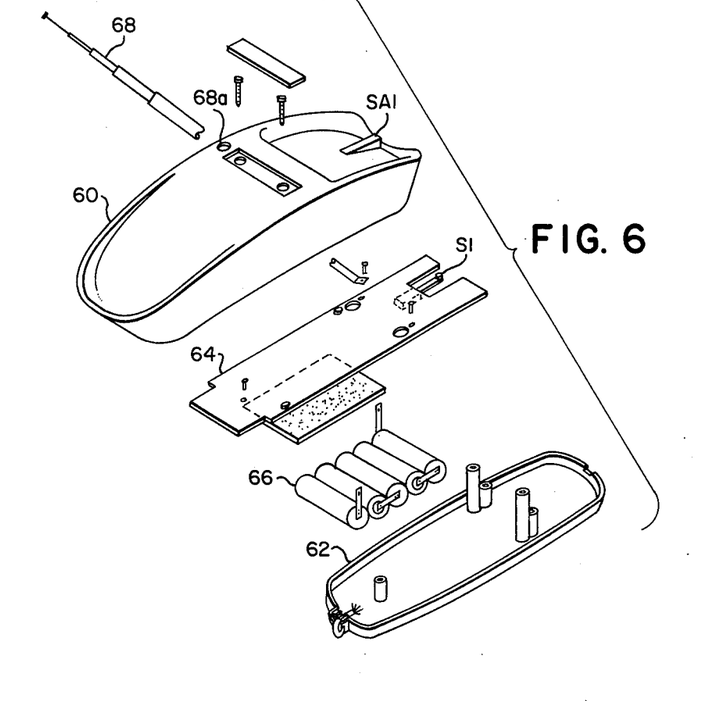
FIGS. 6 and 6A are pictorial views of the preferred telephone cradle, exploded and in detail to illustrate certain structural features providing for duplex transmission from the Mobile Unit to the Base Station.
Figure 6A:
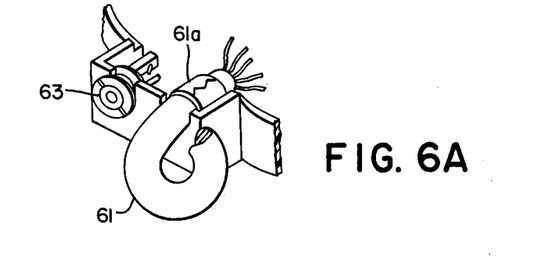
Figure 7:
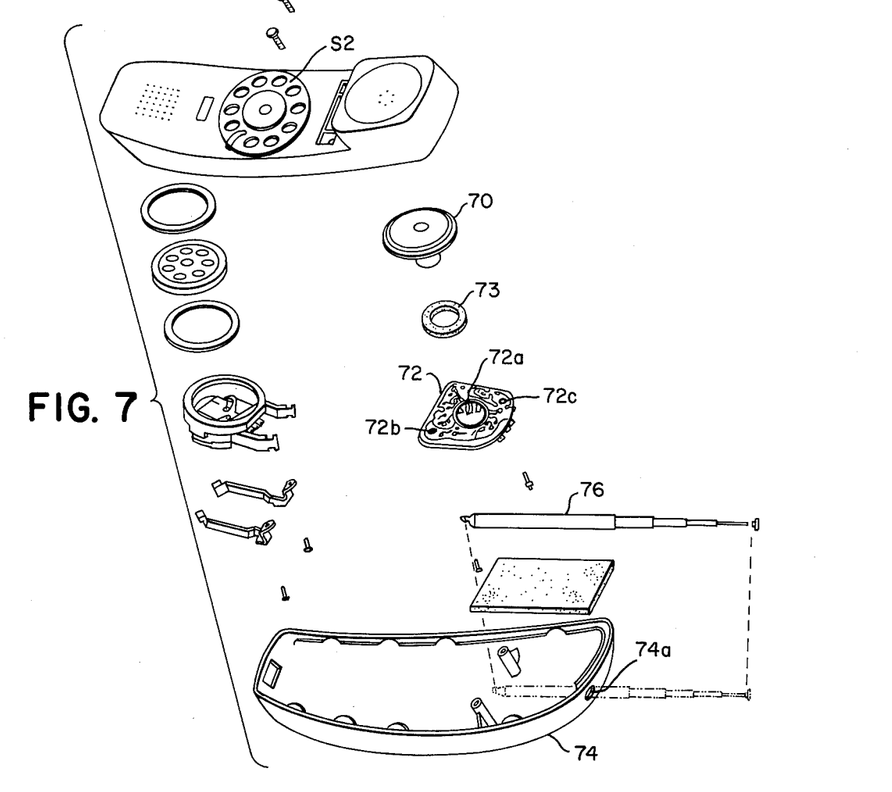

In FIG. 2, duplex voice transmission in the system is provided in the Mobile Unit by Microphone 24 coupled to Transmitter 22 located in the telephone handset, shown in FIG. 7B; and a Speaker 26, located in the earpiece of the handset, coupled to the output of Receiver 20, located in the telephone cradle, shown in FIG. 6. The handset and cradle are described in detail infra in conjunction with FIGS. 6 and 7.

DUPLEX CONTROL SIGNAL TRANSMISSION

Figure 5:
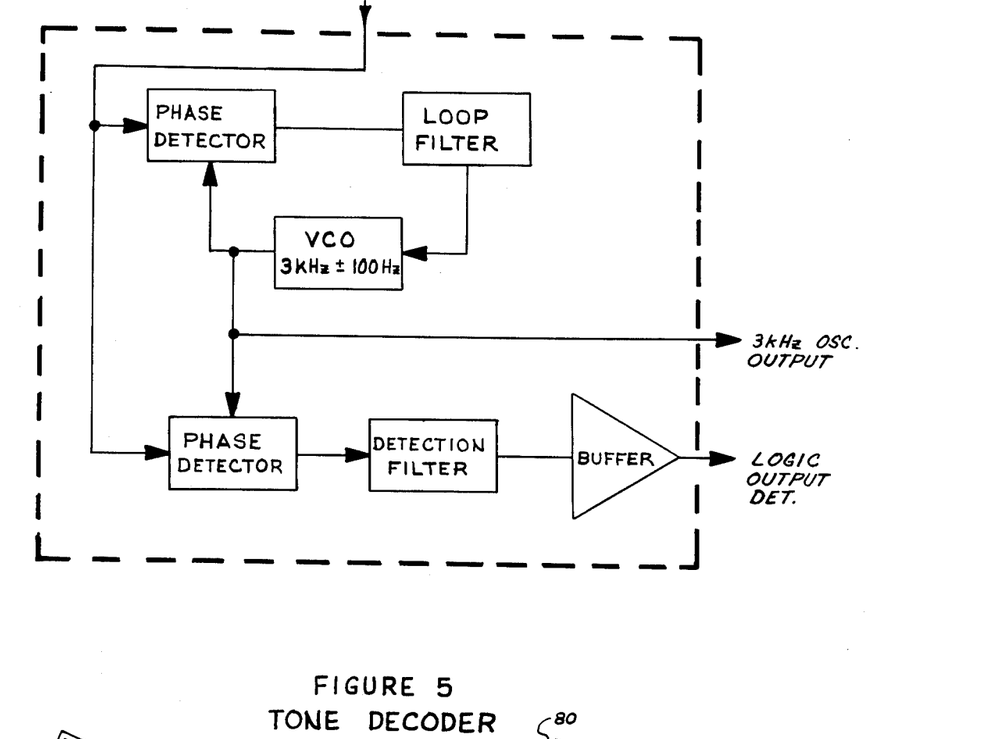
FIG. 5 is a schematic block diagram of a typical one of the preferred Tone Decoders shown in the block diagrams of FIGS. 1 and 2.

The duplex link between the Base Station and Mobile Unit of FIGS. 1 and 2, transmits and receives logic tone control signals and according to the preferred embodiment modulates the carrier by audio tone to produce logic tone control signals, i.e., logic tones, including pulse and pulse width modulation of the transmitted tone. Tone Decoders 18 and 28 produce the audio tone control signals for transmission as well as decode any received tone control signals. A typical one of the preferred Tone Decoders 18 and 28 of the invention is shown in FIG. 5. As shown, it includes a voltage-controlled oscillator, VCO, for supplying an audio tone of 3 KHz, for example, and detects the presence of the audio tone at the input to produce a high logical level output.

Figure 3:
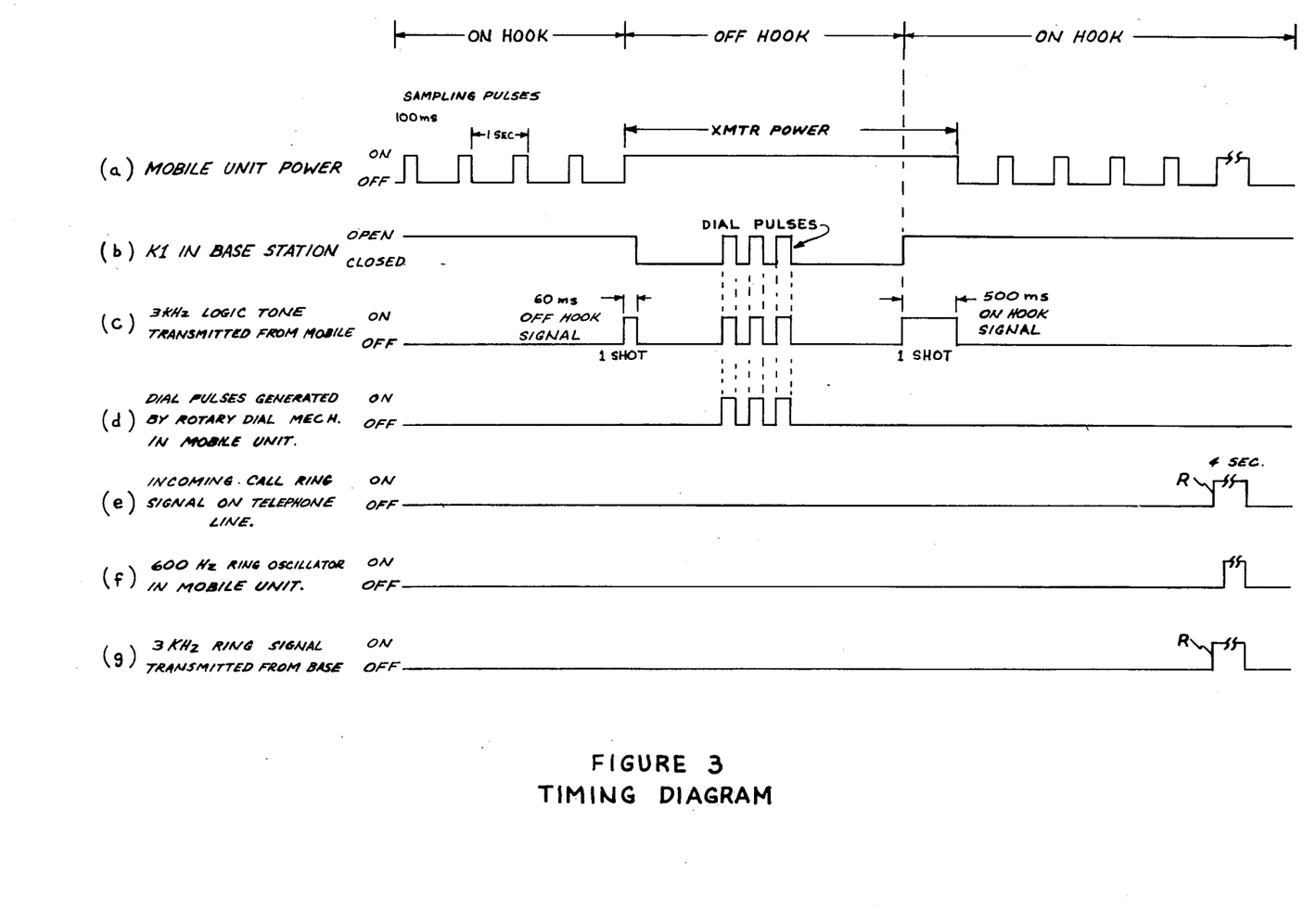
FIG. 3 is a timing diagram for illustrating the operation of the cordless telephone system of the preferred embodiment of the invention.

An incoming telephone call on the subscriber's phone line 10 produces a Ring Signal R, e.g., 170V, 20 Hz signal on the telephone line 10, which is detected by Ring Signal Detector 19 during a typical 2 seconds time interval, indicated by the Timing diagram, FIG. 3(e). The output of Detector 19 actuates Switch K2 to couple the output OSC of the Tone Decoder 18 to a summing circuit Junction Z3, as provided by an operational amplifier, for example. The output of the summing Junction Z3 is applied to the input of the Base Station Transmitter 12 for modulating the transmission at the audio tone rate of 3 KHz, for example, when the Ring Signal R is present on the phone line 10.

In the preferred embodiment, transmission from the Base Station is a low-power signal transmission normally capable of being received by the Mobile Unit, FIG. 2, while located within a limited range of area defined by a radius of 300 feet of the Base Station, for example. To this end, in the preferred embodiment, signal transmitting power is approximately on the order of 100 milliwatts or less. Transmission is limited to the citizens band (Class D, 26.48 to 28.0 MHz) at approximately 26.996 MHz and in a manner described in detail infra. Similarly, signal transmission is provided from the Mobile Unit at approximately 27.195 MHz, for example. Further, it should be noted that these exemplary carrier frequencies preferably are located at the algebraic mean between channels 3–4 and channels 20–21 of the citizens band, respectively. Other carrier frequencies are suitable and have been used with a separation of at least approximately 50 KHz between selected duplex carriers of a pair.

The ring signal transmitted tone modulated carrier is received by Mobile Unit's Receiver 20, FIG. 2, to provide a detected 3 KHz audio tone output which is coupled to the input of the Tone Decoder 28. The detected ring signal tone at output DET is coupled to the input of an Oscillator 21 which is enabled to provide a 600 Hz output to a summing junction Z3, and then, to Audio Amplifier 25 which amplifies the 600 Hz ringing tone to actuate Speaker 26 of the handset.

AM RECEIVER FIGS. 1, 2, 4

Figure 4:
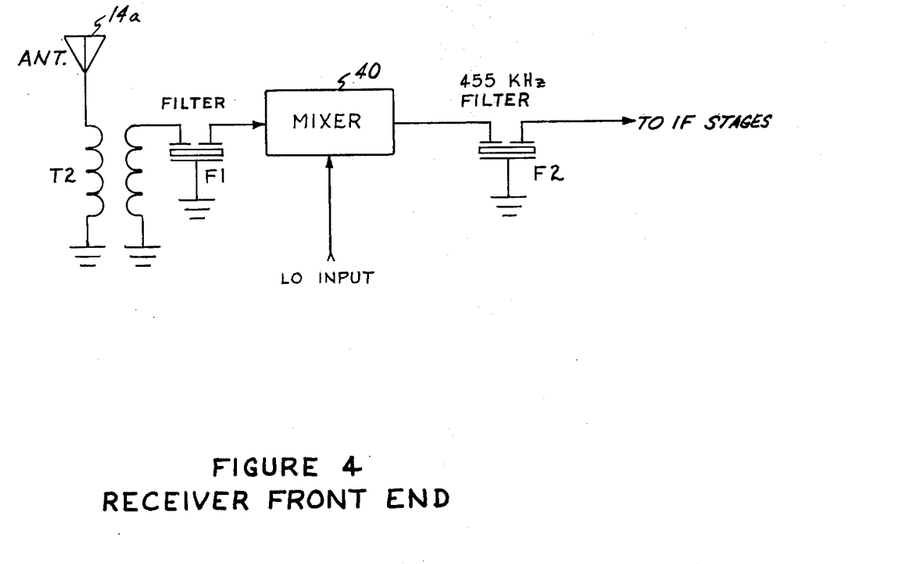
FIG. 4 is a schematic diagram of the preferred Receiver Front End of the Base Station of FIG. 1 in which highly selective reception of the Mobile Unit HF transmission, and rejection of Base Station HF transmission and other HF transmission in the frequency band is provided for minimizing interference.
Figure 4A:
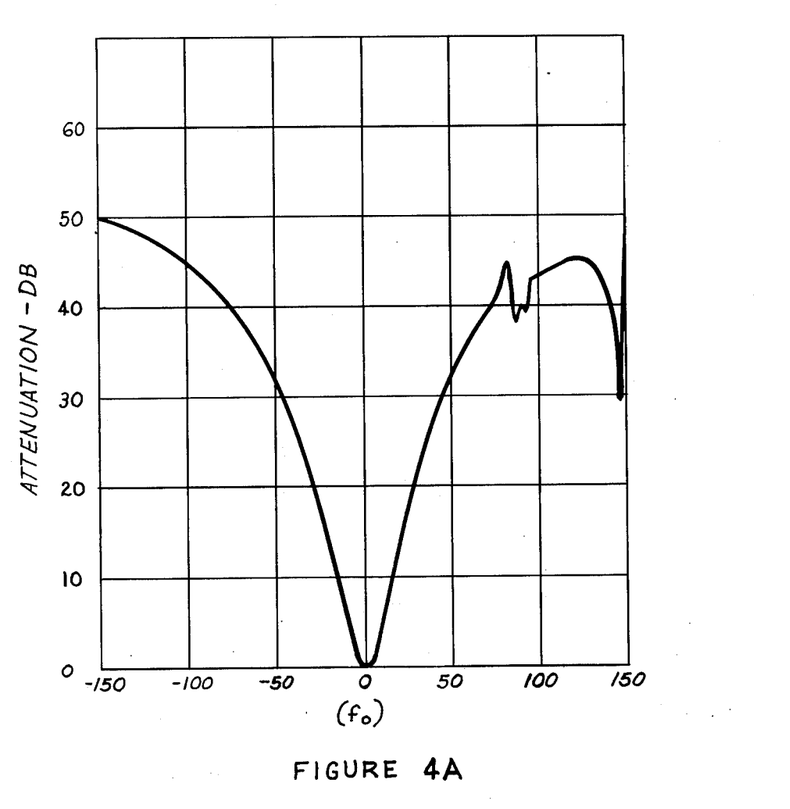
FIG. 4A is a typical attenuation characteristic curve for a narrow bandpass filter located in the Front End of the preferred receiver shown in FIG. 4.

The preferred Mobile Receiver 20, FIG. 2, and Base Station Receiver 14, FIG. 1, are substantially identical with the major exception that in the Base Station Receiver 14, a monolithic crystal bandpass Filter F1 is located in Front End 14b of the Base Station Receiver 14 in the manner as shown in the more detailed schematic diagram of FIG. 4. Antenna 14a is coupled to Filter F1 by Transformer T2. The Crystal Filter F1 is a narrow bandpass filter that rejects all frequencies except the narrow band of Mobile Unit transmission, e.g., 26.996 MHz, and particularly, the Filter F1 is important in rejection of strong signals being transmitted by the adjacent transmitter in the Base Station, e.g., 26.996 MHz carrier frequency. The attenuation of frequencies outside the narrow band of frequencies passed by Filter F1 is shown by the crystal filter attenuation characteristic, FIG. 4A.

The output of Filter F1 is applied to the signal input of Mixer 40 to produce an intermediate frequency (IF) e.g. 455 KHz at its output by the combining of the received signal with the local oscillator frequency Lo, e.g., 26.541 MHz, as shown.

In each receiver, a ceramic bandpass Filter F2 is coupled to the output of Mixer 40 to pass the 455 KHz IF signal. The combination of Filter F1 and F2, as illustrated in FIG. 4, for the Base Station, Receiver 14, is preferred for optimum rejection of relatively strong transmission signals of an adjacent, co-located Transmitter 12.

The IF signal from the Mixer 40 that is passed by Filter F2 is applied to IF stages, e.g., including IF amplifiers followed by an AM detector. Also, the Receivers 14 and 20, preferably include AGC circuits for controlling the level of the signal applied to the Audio Amplifiers 16 and 25. In the Mobile Unit, FIG. 2, the output of Audio Amplifier 25 is applied to Speaker 26 which is located in the handset. Also, Receiver 20 in the Mobile Unit includes a summing Amplifier 23 discussed supra.

AM TRANSMITTERS

The preferred AM transmitters in the Base Station and Mobile Unit are identical with the exception of a monolithic crystal bandpass filter in the Base Station Transmitter. The crystal filter couples the power amplifier of the transmitter to the antenna matching network for attenuating spurious transmitter signals and harmonics and eliminating interference in the adjacent Receiver 14 in the Base Station. Preferably, the transmitter includes a voltage regulator to supply regulated power to the transmitter circuits. Also, the transmitter input circuits include an audio amplifier for voice and audio tone, logic inputs. Preferably, amplified voice and logic tones, amplitude modulate the carrier, e.g., 26.996 MHz, provided by an oscillator whose output is applied to a power amplifier having FET transistor circuits in order to minimize parasitic oscillation and harmonics which could cause interference in commercial television reception.

LOGIC CONTROL CIRCUITS - MOBILE UNIT, FIG. 2

The logic in the Mobile Unit provides for logic tones in response to on/off-hook conditions, dialing impulses and sampling pulses for detecting ring signals. An important feature of the present invention is that all of the functions are provided by logic tones generated and detected by a single Tone Decoder 28 which is described in greater detail in connection with FIG. 5, a schematic block diagram of the preferred decoder.

In the on-hook condition, Hook Switch S1 is open, as shown, and Inverter 74 provides a high positive level output to enable Clock 27 to produce clock pulses that are applied to the respective input of OR Gate Z6, as illustrated in FIG. 2 and the Timing diagram, FIG. 3a. The output of OR Gate Z6 is applied to a solid state Switch K4, schematically shown as a relay, to apply power to the Tone Decoder 28 and Receiver 20 every second during the 100 milliseconds (100 msec.) intervals of the sampling clock pulses. Another important feature is this sampling which conserves battery power in the Mobile Unit while providing for receiving and detecting Ring Signals R, i.e., logic tones transmitted from the Base Station in response to Ring Signals R on the phone line 10, as described in duplex control signal transmission supra. Detection of a ring Signal R during the sampling period (100 msec.) provides an input to OR Gate Z6 from Tone Decoder 28, to maintain Switch K4 operated for supplying continuous power to Decoder 28 and Receiver 20 for the duration of the Ring Signal R, e.g., 2 sec. In this manner, the 600 Hz signal is continuously generated by Oscillator 21 and applied to Speaker 26 of the handset during the ring signal time period, e.g., 2 secs., as shown in the Timing diagram, FIG. 3f. The amplified 600 Hz signal is at a high level to produce a high level of sound in the earpiece by Speaker 26. The high level of sound is audible in the area of the Mobile Unit in the manner of a conventional bell sound.

In the off-hook condition, Hook Switch S1 is closed and a high logical level signal is applied to OR Gate Z3 to operate Switch K3 for supplying power to the Transmitter 22, as shown in FIG. 3a by the time interval of off-hook and the added 500 msec. indicated by the total time period XMTR of transmitter power-on. The high level (+) logical signal produced by closure of Switch S1 is also applied to OR Gate Z6 to operate Switch K4 for continuously supplying power to Tone Decoder 28 and Receiver 20 during the XMTR time period.

An off-hook condition can result from an incoming call (Ring Signal) or to provide for an outgoing call. The outgoing call includes dialing pulses generated by a rotary dial illustrated by dial cam switch. Only one group of pulses of a series of groups is shown by the Timing diagram, FIG. 3d. The change to the high level of the logical signal of the off-hook condition, produced by closure of Switch S1, triggers One-shot 29. The output of One-shot 29 is applied to NAND Gate Z7, via OR Gate Z5, to gate the 3 KHz logic tone OSC to Transmitter 22, via summing Junction Z8 and the pre-modulation filter that attenuates high frequency harmonics.

The off-hook logic tone transmission is received at the Base Station, FIG. 1, and applied to the Tone Decoder 18 to provide the high logical output level DET. The output DET sets flip-flop F1 to provide a high logical level output Q to AND Gate Z2 to operate Switch K1 to close the circuit to phone line 10, as shown by FIG. 3b. AND Gate Z2 is enabled by the output Q to produce a high logical level output only in the absence of output DET at the other input to Z2 which input is supplied by Inverter Z1. The output of Inverter Z1 is normally at the high logical level except in the presence of high level output DET during 3 KHz transmission from the Mobile Unit, i.e., during the off-hook signal dial pulses and on-hook signal having time periods shown in FIG. 3c, for example.

Accordingly, dial pulses produced during outgoing calls by Mobile Unit's Dial Cam Switch S2, FIG. 3d, initiates transmission of the digits of the telephone number by a group of digital pulses (1–10) for each digit to the telephone exchange via the subscriber's phone line 10.

Connection to the phone line 10 is maintained by Latch F1 which operates K1 60 msec. after the handset is picked up, i.e., off-hook, until it is returned on-hook, with the exception of dial pulse intervals during dialing of the telephone number on outgoing calls, as illustrated by waveforms in FIG. 3b of the Timing diagram. The Latch F1 is set by the 60 msec. off-hook logic tone (3 KHz) to produce the high level output Q that is maintained at the high level until reset by the 500 msec. on-hook logic tone, FIG. 3c. Preferably, R1 and C1 are selected so that at least 200 msec. of the 500 msec. duration of the on-hook logic tone signal is adequate to charge capacitor C1 through resistor R1 to produce the reset pulse which resets Latch F1. Off-hook logic tone signal and each of the dial tone pulses (60 ms.) are not of sufficient time duration to charge capacitor C1 to the level necessary to provide for reset. Diode D1 provides a low impedance path for rapid discharge of capacitor C1 to allow a quick succession of signals, i.e., 500 ms. on-hook closely followed by a 60 ms. off-hook signal, wherein the 60 ms. signal can be effective in setting the Latch F1 and not be simultaneously reset by a high level charge remaining on capacitor C1.

TONE DECODER, FIG. 5

Referring now to FIG. 5, the typical preferred Tone Decoder is shown schematically by a block diagram. Tone Decoders 18 and 28 in the Base Station and Mobile Unit, FIGS. 1 and 2, provide the logic tone at the output OSC and the logic level indicative of the received logic tone at the logic output DET. Accordingly, the Input of the Tone Decoder is coupled to the audio output provided by the detectors of Receivers 14 and 20 to provide binary logic levels at output DET in response to received logic tones (3 KHz).

The Tone Decoder comprises a phase-locked loop including a voltage-controlled oscillator VCO, controlled to oscillate at 3 KHz ± 100 Hz. The oscillator is coupled to a Phase Detector and Loop Filter to complete the phase-locked loop in which this Phase Detector is connected directly to the input. The Phase Detector provides a bi-polar signal in response to a phase error between a logic tone at the Input and the VCO oscillator frequency. The Loop Filter is responsive to the bi-polar signal to produce a DC signal proportional to the difference in phase of the logic tone at the Input and the VCO oscillator phase. The oscillator is responsive to the DC signal from the Loop Filter to bring the oscillator into phase with the logic tone at the Input.

Any logic tone present at the Input and the VCO output that are applied to respective inputs of a second Phase Detector produce a binary level logic output. A low-level output is produced when no logic tone is present at the Input. A high-level output is produced when a logic tone is present at the Input and a positive, in-phase comparison is made of tone and oscillator frequencies in second Phase Detector. The output of the second Phase Detector is coupled a detection filter and buffer amplifier to provide the resulting logic level output.

SYSTEM OPERATION, FIGS. 1-3

In the quiescent state, the Mobile Unit is in the on-hook condition and Line Switch K1 in the Base Station is open, interrupting the connection to the phone line 10.

Considering first an incoming call in phone line 10, a Ring Signal R, FIG. 3e, produced on the line 10, FIG. 1, detected by the Ring Signal Detector 19 to provide an output, actuating Switch K2 to cause transmission of the logic tone at the 3 KHz frequency. Actuation of the Switch K2 connects the OSC output of Tone Decoder 18 to the summing Junction Z3 which is coupled to the input of Transmitter 12 of the Base Station to cause transmission of the logic tone to the Mobile Unit, FIG. 2.

The transmitted logic tone for the ring signal, FIG. 3g, is received by Mobile Unit Receiver 20 and coupled to the input of Tone Decoder 28 to produce a high logical level output DET which is coupled to oscillator 21 to produce the 600 Hz ring tone, FIG. 3f, on Speaker 26 in the handset.

When the ring tone is audibly reproduced by Speaker 26 and heard by the subscriber, the handset is lifted from the cradle of the telephone to actuate Hook Switch S1 to place the system in the off-hook condition. In response to the high level signal produced by closing Switch S1, One-shot 29 produces a 60 ms. high level logic output which is passed by OR Gate Z5 to gate the logic tone from the OSC output of Tone Decoder 28 through enabled NAND Gate Z7 to cause transmission of the logic tone for the time interval of the one shot, i.e., 60 ms., FIG. 3c. The 3 KHz logic tone is transmitted by the Mobile Unit by coupling the logic tone to the input of the Transmitter 22 via the summing Junction Z8.

Receiver 14 of the Base Station which is tuned to the transmitted carrier of the Mobile Unit receives and detects the 3 KHz logic tone and couples it to Tone Decoder 18 to provide the high level output DET which actuates the latch F1 at the Set input. After the 60 ms. pulse, AND Gate Z2 is enabled to gate the high output Q which causes the Switch K1 to be operated, FIG. 3b, completing the circuit from the phone line 10 to the primary of Audio Transformer T1. As noted earlier, the other input to AND Gate Z2 is provided by the output of Inverter Z1. The operational sequence can be best illustrated by reference to FIGS. 3b and c.

The dial pulses during the off-hook time interval are only present during dialing for an outgoing call. Proceeding to the end of the telephone conversation, the handset is returned to the cradle and the system returns to the on-hook condition. The sequence includes opening of Hook Switch S1 to produce a high level pulse at the output of Inverter Z4, FIG. 2, to trigger One-shot 29a to provide the 500 ms. on-hook logic tone signal transmission. This logic tone is received by the Base Station decoder to provide a high logical level at output DET to unlatch F1 disable and thereby disable AND Gate Z2 that opens phone line Switch K1.

Conserving battery power in the Mobile Unit is provided by monitoring for received ring tones (3 KHz) by sampling pulses provided by an enabled Clock 27 during on-hook time periods, FIG. 3a. Sampling pulses passed by OR Gate Z6, FIG. 2, operates power Switch K4 to supply power to the Tone Decoder 28, Receiver 20, and Oscillator 21 for approximately 10% of the time at the preferred sampling rate. The power source consists of rechargeable nickel-cadmium battery pack which will operate the Mobile Unit for 8 to 12 hours of continuous telephone conversation or 3 to 4 days of operation under normal use of one hour per day of telephone conversation.

In the event ring tone transmission is received and detected during a sampling pulse, the output DET goes to the high level to maintain K4 closed for the 2 second time period of each Ring Signal R. The sampling continues until an off-hook condition is produced by lifting of the handset to close Switch S1. The high logical level coupled through Switch S1 is passed by OR Gate Z6 to maintain the supply of power to the Receiver 22 and the control circuits therefor.

When Hook Switch S1 is closed, the high logic level is also coupled to OR Gate Z3 and Switch K3 to connect the power source to the Transmitter 22. In addition, power is supplied to Tone Decoder 28, Receiver 20, and Transmitter 22 during the time period of One-shot 29a which provides the 500 ms. on-hook signal as illustrated by waveforms in FIG. 4a and 4c.

Outgoing calls are initiated by picking up the handset from the cradel which opens Hook Switch S1, FIG. 2, which produces the 60 ms. high level off-hook signal at the output of One-shot 29. This signal is passed by OR Gate Z5 to enable NAND Gate Z7 to pass the 3 KHz logic tone, FIG. 3c, to the Transmitter 22. The 3 KHz logic tone transmission is received by the Base Station to provide an output from Tone Decoder 18 to set the latch F1 to provide a high output Q which is passed by AND Gate Z2 to close line Switch K1 at the end of the 60 ms. off-hook signal. As is evident, any detected logic tone is inverted by Inverter Z1 to disable AND Gate Z2 for the duration of the tone. At the end of the 60ms. time period of the detected logic tone, the output of Inverter Z1 returns to the high level to enable AND Gate Z2 to pass the high output Q to close line Switch K1, FIG. 3b.

In dialing the telephone number of the destination of an outgoing call, each operation of the rotary dial causes Dial Cam Switch S2 to be opened and closed to generate a group of pulses, each group corresponding to a respective one of the digits in the telephone number. The high level logical digital pulses of 60 ms. duration, for example, are passed by OR Gate Z5, as illustrated in FIG. 3d, to gate the 3 KHz logic tone from decoder output OSC. Each group of logic tone pulses are coupled to Transmitter 22 to be transmitted to Base Station Receiver 14 to actuate Tone Decoder 18 to provide a pulsed output DET which is inverted to disable AND Gate Z2, opening line Switch K1 in a pulse sequence as illustrated in FIG. 3b for one group of pulses for the digit 3. The pulsed operation of line Switch K1 transmits the telephone number along phone line 10 to the telephone exchange. The telephone switching equipment is responsive to the pulse coded telephone number to connect phone line 10 to the phone line of the selected party for two-way voice communication from the cordless telephone via the Base Station and phone line 10.

At the end of the telephone conversation, the logic control is responsive to replacing the handset to terminate the off-hook condition and return to the on-hook condition during the 500 ms. logic tone provided for reset of the latch F1 to a open line Switch K1. This operation has been described supra in connection with the incoming call and reference is made thereto for a further description of the operation.

STRUCTURE OF THE TELEPHONE INSTRUMENT, FIGS. 6 AND 7

The enclosures for the telephone Cradle 60 and handset are of conventional construction and can be purchased from several telephone equipment manufacturers. The rotary dial mechanism and microphone assembly in the handset are also of conventional construction. While the top of the cradle enclosure is of standard shape and construction, the Cradle Base Plate 62 includes important structural improvements according to the present invention.

In addition to interfacing with the standard top enclosure, the Base Plate 62 provides support for the printed circuit board 64 and circuit components mounted thereon. The board is supported on short posts to provide space for nickel cadmium battery pack 66 disposed between the Base Plate 62 and the circuit board 64.

In general, the cradle enclosure provides a housing for the nickel cadmium battery pack circuit components and printed circuit board which is secured to the top of a set of the three short posts that are projecting upwardly from the Base Plate 62. A pair of taller posts are formed integral with an opposing pair of short posts to provide lateral support for the taller posts.

A pair of openings are located in the printed circuit boards 64 to pass the upper portions of the taller posts. In the assembly, the battery pack 66 is supported directly on the upper surface of the Base Plate 62 and between a single smaller post located at one end of the base plate and the pair of higher posts, as shown. Preferably, a small thin sheet of polyurethane is laid over the top of the batteries to insulate the battery casings from circuits printed on the lower side of the printed circuit board 64. When the printed circuit board is positioned over the base plate by passing the upper portions of the large posts through the corresponding apertures, the circuit board is secured to the Base Plate 62 by screws passing through the apertures and threaded in the openings in the top of the three smaller posts.

The battery pack 66 is connected to the printed circuit board 64 to supply power for the transmitter, receiver, and control circuits located in the telephone cradle and handset of the Mobile Unit. Upwardly projecting end terminals of the battery pack 66 pass through corresponding apertures provided in the printed circuit board and these end terminals are connected to the printed circuit, power distribution leads. Preferably, these battery terminals are removably secured to the printed circuit board 64 to facilitate replacement of the battery pack.

Also in the preferred arrangement of the present invention, the printed circuit board 64 is continuous one-piece construction having double-sided printed circuits formed thereon with components mounted on the upper side of the circuit board on the section located above the battery pack 66, and components mounted on the lower side of the remainder of the printed circuit board, located on the opposite side of the larger posts and about Hook Switch S1. Switch S1 is mounted on the lower side of the circuit board and contact reeds projects into the elongated aperture to be located opposite the Switch Actuator SA1.

Circuit components including transistors, transformers, resistors, and condensors are disposed on the top side of the printed circuit board 64 above the battery pack 66 and positioned in the space provided in the cradle enclosure. The opposite end of the cradle enclosures includes a recessed section to receive the earpiece of handset. Accordingly, the circuit components are located below the printed circuit board 64 in the space between the Base Plate 62 and the circuit board.

As shown in FIG. 6, the Antenna 68 passes through an opening 68a and is secured to the printed circuit board at the lower end of the antenna by passing a screw through an opening in the end of the antenna for securing the antenna to an antenna circuit printed on the circuit board 64. The position of the opening in the printed board 64 for securing the lower end of the Antenna 68 to the board after passing through the opening 68a so that the antenna projects diagonally and upwardly at an angle so as not to interfere with picking-up or returning the handset to the cradle.

Connections between the cradle and handset are provided by a retractable Coil Cord 61 shown in detail in FIG. 6. The cord passes through one of the openings provided in the end of Base Plate 62. Wires in the retractable cord are removably connected to the near end of the printed circuit board 64 by fastening means not shown. Strain relief for the retractable Cord 61 is provided by a band 61a of larger diameter than the corresponding opening in the Base Plate 62. Thus, strain exerted on the cord is not coupled to means for removably fastening cord wires to the circuit board 64. Removable connectors on the ends of the wires are more clearly shown in FIGS. 8A and 8B, for example.

A Power Jack 64 is located adjacent the retractable Cord 61 in an opening in the Base Plate 62. An annular channel in the jack receives the edge of the base plate to secure it from withdrawal. The central opening in the jack receives the plug from a battery charger and the terminals of the jack located inside the Base Plate 62 are connected to a charging circuit for recharging battery pack 66.

The Cradle 60 seats on the peripheral edge of the Base Plate 62 and is secured to the Base Plate 62 by screws passing through spaced openings in the cradle cover and threaded into opposing openings in the top of the taller posts projecting upwardly from the Base Plate 62. The seating of the cradle cover on the peripheral edge of the Base Plate 62 also secures the retractable cord and Jack 63 in respective openings in the end of the Base Plate 62.

HANDSET, FIGS. 7 AND 7A

The handset for the Mobile Unit includes a microphone, earpiece Speaker 70, transmitter circuit board 72 and a standard telephone rotary dial mechanism S2. The microphone is of conventional construction and includes microphone element, coil cup assembly and brackets for the coil cup, as shown in FIG. 7. The opposite end of the handset includes the earpiece Speaker 70 and important structural features of the present invention which provide for a transmitter in the handset. The Transmitter 23, FIG. 2, is contained by circuits including circuit components located on the printed circuit board 72. A central opening 72a in the printed circuit board 72 receives and passes the permanent magnet of the Speaker 70 and a polyurethane Washer 73 is disposed between the metal casting of the speaker and the printing circuit on the printed circuit board 72. The transmitter circuit components are located on the underside of the printed circuit board 72 to project into the handset cover 74. A thin section of soft insulating material, such as polyurethane foam, serves to protect components from shock transmitted to the handset cover.

Figure 7A:
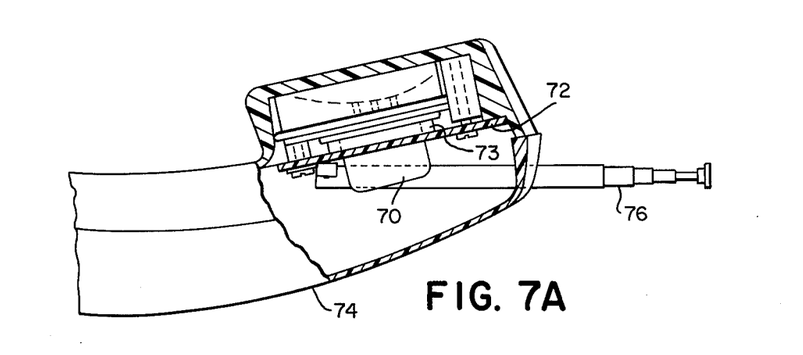

In assembly, the Speaker 70 seats in the end of the handset and the transmitter circuit board 72 is secured in position by screws passing through openings 72b and 72c to thread into opposing openings in the end of the handset adjacent the periphery of Speaker 70, as shown in FIG. 7A. An Antenna 76 is connected to the transmitter circuit board 72 at opening 72b. Accordingly, the assembly includes passing fasteners through the end of the antenna to secure it to the circuit board 70 and connected in the antenna circuit printed on the board. The mounted Antenna 76 is disposed parallel to the Base Plate 68 when the handset is placed in the Cradle 60, and any surface the Cradle 60 is placed upon to prevent a minimum of interference with the handling of the instrument. An important feature of the invention is to provide an opening 74a located to align the Antenna 76 parallel to the cradle base plate when the end of the antenna is connected to the transmitter circuit after assembly of the handset. Also, the location of the projecting portion of the antenna is such that in placing the handset in operative position for conversation by a subscriber, the antenna projects in an area away from and above the speaker's head. Accordingly, the antenna can be extended to any desired length and placed on the cradle without touching the surface of a table on which the cradle rests. Further, the location of Antenna 76 provides for optimum reception when in use and located above and away from the user's head, in that it is located at the highest point above the ground plane and free from any shielding effect of the body of the user, especially the hand since it extends above and away from the body. The transmitter-speaker assembly is shown clearly in the sectional view of FIG. 7A. The Antenna 76 and transmitter circuit board 72 are shown secured to the handset and providing mounting support for the Speaker 70.

ALTERNATE ANTENNA ARRANGEMENTS, FIGS. 8A AND 8B

Figures 8A, 8B:
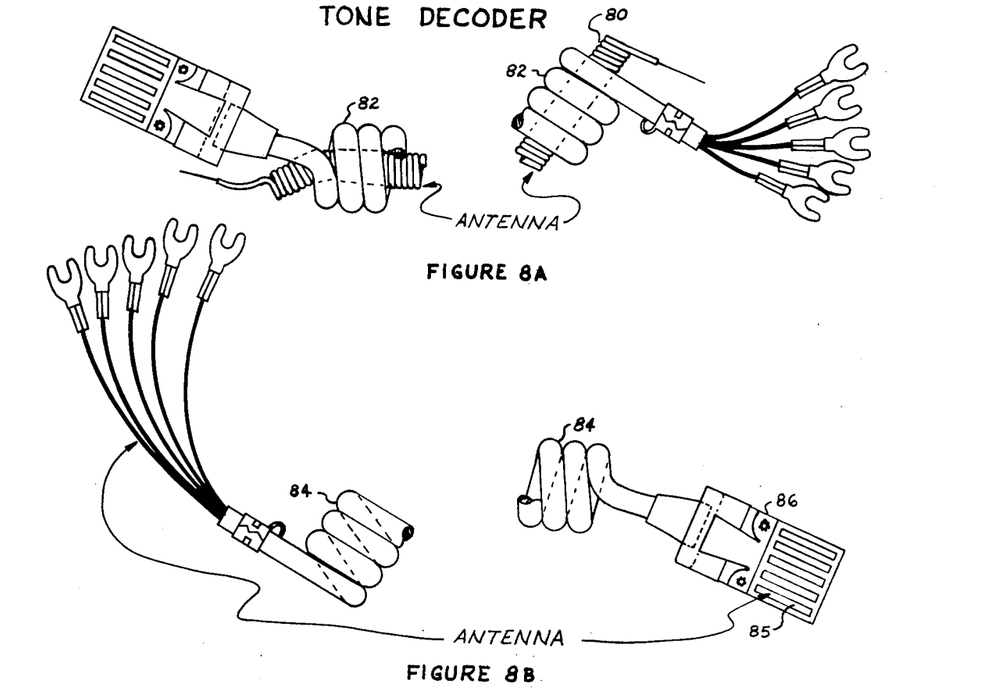
FIGS. 8A and 8B are pictorial views of the alternate preferred antenna structure employing the handset-to-cradle cord of the telephone Mobile Unit.

An antenna consisting of a helical wound conductor 80 is shown contrained within a telephone retractable coil Cord 82. Separate antennas comprise individual helical wound conductors constrained within the Cord 82. In the alternate antenna construction shown in FIG. 8B, the antenna consists of one or more conductors in a telephone retractable coil Cord 84. For example, the transmitter antenna circuit would be connected to conductive Segment 85 of the Plug 86 in which Segment 85 is connected to the corresponding one of the conductors in the Cord 84 and preferably terminates in the end at the desired antenna length. The opposite end of the Cord 84 includes a conductor which is connected to the antenna circuit of the receiver in the cradle and extends within the retractable Cord 84 to provide the desired length of antenna for the receiver at transmission frequency.

While preferred embodiments of the present invention have been disclosed, it should be clear that the present invention is not limited thereto, as many variations will be readily apparent to those skilled in the art. For example, medium scale and large scale integrated circuits may be substituted for printed circuit boards and components mounted thereon in order to conserve the space required inside the telephone instrument. This includes integrated circuit chips wherein medium scale or large scale integrated circuits would be more than adequate to provide the circuitry of the transmitter receiver and control circuits. Further, it is apparent to those skilled in the art that an FM duplex link can be readily substituted for the preferred embodiment which discloses an AM duplex link. The advantage of th FM transmission in an FM duplex link is the substantial reduction in noise whenever the system is located in a noisey environment, e.g., man-made noise.

What is claimed is:

1. A cordless telephone system providing for connection from a cordless telephone to a subscriber's telephone line, said telephone system comprising:
    cordless telephone apparatus including radiant energy, duplex transmission and receiving communication means providing for simultaneous two-way communication between a base station connected to said telephone line and said cordless telephone;
    system control means comprising electronic means for electronically controlling said communication means including means at saicd cordless telephone for producing logic tones of first and second time durations for transmission of logic signals between said cordless telephone and said base station in response to telephone actuating and deactuating condition, respectively;
    said system control means further including electronic detector means at said base station for electronically detecting said logic tones to produce first and second detection signals, respectively, and means responsive to said first detection signal to latch the telephone line and responsive to second detection signal to unlatch the telephone line to initiate and terminate, respectively, duplex transmission and reception between said telephone line and said cordless telephone.

2. The cordless telephone system of claim 1 in which said base station includes a transmitter having means for generating a carrier signal including crystal filter circuit means for limiting carrier transmission to a narrow band of frequencies including said carrier signal, and an adjacent receiver including crystal filter circuit means for limiting reception to a different narrow band of frequencies for a received carrier signal and rejecting the carrier signal of said transmitter.

3. the cordless telephone system according to claim 2 in which said base station transmitter includes a power amplifier, antenna and antenna matching network, and said crystal circuit means couples said power amplifier to the antenna matching network for attenuating spurious transmitter signals and harmonics for eliminating interference in the receiver.

4. A cordless telephone carrier communication system comprising:
   a cordless telephone set including duplex communication means for transmitting and receiving information concurrently for cordless duplex communication;
   subscriber telephone line duplex base station communication means adapted to be connected to a telephone line for transmitting and receiving information concurrently for cordless duplex communication between the cordless telephone set and the subscriber telephone line;
   electronic control means for said communication system including logic means for electronically producing first and second logic tone control signals of different time durations for transmission between said cordless telephone set and said base station communication means in response to telephone actuating and deactuating conditions respectively, and further including electronic detection means responsive to said first and second logic tone control signals for latching and unlatching the connection to the telephone line to initiate and terminate, respectively, cordless communication between the cordless telephone set and the telephone line; and
   said subscriber telephone line duplex base station communication means further comprising transmitter circuit means including means for generating a first carrier signal for transmission and crystal means for passing a narrow band of frequencies including said carrier, and a receiver including crystal filter means for limiting reception to a different narrow band of frequencies including a second carrier, thus enabling concurrent transmission and reception of information on said first and second carriers, respectively.

* * * * *